(12) United States Patent
Song et al.

(10) Patent No.: US 11,881,947 B2
(45) Date of Patent: Jan. 23, 2024

(54) HYBRID AUTOMATIC REPEAT REQUEST ACKNOWLEDGEMENT SENDING METHOD AND TERMINAL

(71) Applicant: VIVO MOBILE COMMUNICATION CO., LTD., Guangdong (CN)

(72) Inventors: Yang Song, Dongguan (CN); Peng Sun, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 313 days.

(21) Appl. No.: 17/369,299

(22) Filed: Jul. 7, 2021

(65) Prior Publication Data

US 2021/0336724 A1 Oct. 28, 2021

Related U.S. Application Data

(63) Continuation of application No. PCT/CN2020/070873, filed on Jan. 8, 2020.

(30) Foreign Application Priority Data

Jan. 9, 2019 (CN) .................. 201910020806.X

(51) Int. Cl.
*H04L 1/1812* (2023.01)
*H04L 1/1607* (2023.01)
*H04W 72/23* (2023.01)

(52) U.S. Cl.
CPC .......... *H04L 1/1812* (2013.01); *H04L 1/1614* (2013.01); *H04W 72/23* (2023.01)

(58) Field of Classification Search
CPC ... H04L 1/1812; H04L 1/1614; H04L 1/1822; H04L 5/0035; H04L 5/0053;
(Continued)

(56) References Cited

U.S. PATENT DOCUMENTS 10,461,895 B2 * 10/2019 Rosa .................. H04L 5/0055
10,708,889 B2 * 7/2020 Zhang ................ H04W 72/04
(Continued)

FOREIGN PATENT DOCUMENTS

CN 102823182 A 12/2012
CN 104767595 A 7/2015
(Continued)

OTHER PUBLICATIONS

Supplementary European Search Report regarding Patent Application No. 20739183.0-1205/3911078; PCT/CN2020/070873, dated Mar. 3, 2022.
(Continued)

*Primary Examiner* — James C Kerveros
(74) *Attorney, Agent, or Firm* — Harness, Dickey & Pierce, P.L.C.

(57) ABSTRACT

An HARQ-ACK sending method includes: sending HARQ-ACKs born by a plurality of physical uplink control channel resources on a second PUCCH resource. The HARQ-ACKs include a joint HARQ-ACK codebook composed of a plurality of HARQ-ACK codebooks, the plurality of HARQ-ACK codebooks correspond to a plurality of downlink transmission resources from different transmission reception points.

20 Claims, 3 Drawing Sheets

(58) Field of Classification Search
CPC ... H04L 5/0055; H04L 1/1861; H04L 5/0064; H04W 72/23; H04W 72/56
USPC .......................................................... 714/748
See application file for complete search history.

(56) References Cited

U.S. PATENT DOCUMENTS

| | | | |
|---|---|---|---|
| 11,233,551 B2* | 1/2022 | Ye | H04L 5/0055 |
| 11,425,697 B2* | 8/2022 | Tiirola | H04W 72/21 |
| 2011/0103503 A1 | 5/2011 | Shin et al. | |
| 2013/0016688 A1 | 1/2013 | Han et al. | |
| 2016/0337089 A1 | 11/2016 | Chen et al. | |
| 2018/0048451 A1 | 2/2018 | Yin et al. | |
| 2018/0110042 A1 | 4/2018 | Chen et al. | |
| 2021/0153185 A1* | 5/2021 | Schober | H04L 5/0051 |
| 2022/0303060 A1* | 9/2022 | Yang | H04L 1/1812 |

FOREIGN PATENT DOCUMENTS

| | | | |
|---|---|---|---|
| CN | 107567033 A | 1/2018 | |
| WO | WO-2018071110 A1 | 4/2018 | |
| WO | WO-2018127628 A1 | 7/2018 | |
| WO | WO-2018204730 A1 | 11/2018 | |

OTHER PUBLICATIONS

"Summary of AI: 7.2.8.2 Enhancements on Multi-TRP/Panel Transmission of Offline Discussion," Huawei, HiSilicon, 3GPP TSG RAN WG1 Meeting #95, R1-1814003, dated Nov. 16, 2018.

International Search Report and Written Opinion of the International Searching Authority regarding International Patent Application No. PCT/CN2020/070873, dated Mar. 17, 2020. Translation provided by Bohui Intellectual Property.

First Office Action regarding Chinese Patent Application No. 201910020806.X, dated Oct. 23, 2020. Translation provided by Bohui Intellectual Property.

Second Office Action regarding Chinese Patent Application No. 201910020806.X, dated May 14, 2021. Translation provided by Bohui Intellectual Property.

"Layer 1 enhancements for NR URLLC," NTT Docomo, Inc., 3GPP TSG RAN WG1 Meeting #94bis, R1-1811378, Oct. 12, 2018.

"PUCCH resource allocation for HARQ-ACK and SR," Huawei, HiSilicon, 3GPP TSG RAN WG1 Meeting #89, R1-1706960, May 19, 2017.

* cited by examiner

HYBRID AUTOMATIC REPEAT REQUEST ACKNOWLEDGEMENT SENDING METHOD AND TERMINAL

CROSS-REFERENCE TO RELATED APPLICATIONS

This application is a Bypass Continuation Application of PCT/CN2020/070873 filed on Jan. 8, 2020, which claims priority to Chinese Patent Application No. 201910020806.X filed on Jan. 9, 2019, which are incorporated herein by reference in their entirety.

TECHNICAL FIELD

The present disclosure relates to the field of communication technologies, and in particular, to a hybrid automatic repeat request acknowledgement (HARQ-ACK) sending method and a terminal.

BACKGROUND

To increase the reliability and throughput of transmission in a communications systems, excessive transmission reception points (TRPs) may be sent. In this scenario, a terminal can perform transmission with a plurality of TRPs simultaneously. When the terminal performs transmission with the plurality of TRPs simultaneously, a plurality of carriers and physical uplink control channel (PUCCH) resources for sending hybrid automatic repeat request acknowledgements may conflict. If the terminal cannot send the plurality of PUCCHs simultaneously, all HARQ-ACKs born by the plurality of PUCCH resources fail to be sent. As a result, the HARQ-ACK feedback performance of the terminal is relatively low.

SUMMARY

Embodiments of the present disclosure provide a HARQ-ACK sending method and a terminal.

According to a first aspect, an embodiment of the present disclosure provides a HARQ-ACK sending method, applied to a terminal, and including:
when a plurality of PUCCH resources that bear HARQ-ACKs conflict with each other, sending a HARQ-ACK born by a first PUCCH resource on the first PUCCH resource, and discarding HARQ-ACKs born by remaining PUCCH resources, where
the first PUCCH resource is one of the plurality of PUCCH resources.

According to a second aspect, an embodiment of the present disclosure provides a HARQ-ACK sending method, applied to a terminal, and including:
sending HARQ-ACKs born by a plurality of PUCCH resources on a second PUCCH resource, where
the second PUCCH resource is a PUCCH resource different from the plurality of PUCCH resources, the plurality of PUCCH resources that do not conflict with each other, or a PUCCH resource.

According to a third aspect, an embodiment of the present disclosure provides a terminal, including:
a sending module, configured to: when a plurality of PUCCH resources that bear HARQ-ACKs conflict with each other, send a HARQ-ACK born by a first PUCCH resource on the first PUCCH resource, and discard HARQ-ACKs born by remaining PUCCH resources, where
the first PUCCH resource is one of the plurality of PUCCH resources.

According to a fourth aspect, an embodiment of the present disclosure provides a terminal, including:
a sending module, configured to send HARQ-ACKs born by a plurality of PUCCH resources on a second PUCCH resource, where
the second PUCCH resource is a PUCCH resource different from the plurality of PUCCH resources, the plurality of PUCCH resources that do not conflict with each other, or a PUCCH resource.

According to a fifth aspect, an embodiment of the present disclosure provides a terminal, including: a memory, a processor, and a program stored in the processor and executable on the processor, where when the program is executed by the processor, the steps of the HARQ-ACK sending method according to the first aspect or the steps of the HARQ-ACK sending method according to the second aspect are implemented.

According to a sixth aspect, an embodiment of the present disclosure provides a non-transitory computer-readable storage medium, where the non-transitory computer-readable storage medium stores a computer program, and when the computer program is executed by a processor, the steps of the HARQ-ACK sending method according to the first aspect or the steps of the HARQ-ACK sending method according to the second aspect are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more preferred or having more advantages than another embodiment or design scheme. Exactly, use of the word such as "exemplary" or "example" is intended to present a concept in a specific manner.

The embodiments of the present disclosure are described below with reference to the accompanying drawings. A HARQ-ACK sending method and a terminal provided in the embodiments of the present disclosure may be applied to a wireless communications system. The wireless communications system may be a $5^{th}$ generation (5G) system, an evolved Long Term Evolution (eLTE) system, an LTE system, or a subsequent evolved communications system.

Figure 1:
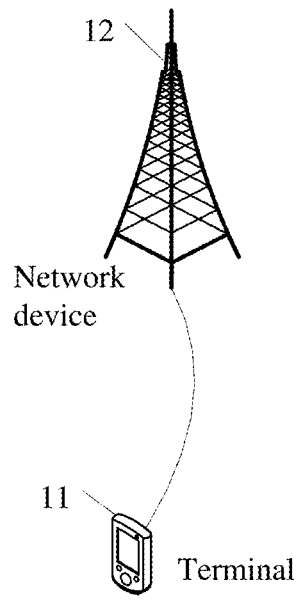
FIG. 1 is a structural diagram of a network system to which embodiments of the present disclosure can be applied.

Referring to FIG. 1, FIG. 1 is a structural diagram of a network system to which an embodiment of the present disclosure can be applied. As shown in FIG. 1, the network system includes: a terminal 11 and a network device 12, where the terminal 11 may be user equipment (UE) or another terminal side device, for example, a terminal side device such as a mobile phone, a tablet personal computer, a laptop computer, a personal digital assistant (PDA), a mobile internet device (MID), or a wearable device. It should be noted that a specific type of the terminal 11 is not limited in the embodiment of the present disclosure. The network device 12 may be a base station in $4^{th}$ generation (4G), 5G, or later releases, or a base station in other communications systems, or is referred to as a Node B, an Evolved Node B, a TRP, an access point (AP), or other words in the field, as long as the same technical effect is achieved. The network device is not limited to specific technical words. In addition, the network device 12 may be a master node (MN) or a secondary node (SN). It should be noted that in embodiments of the present disclosure, only the 5G base station is used as an example, but a specific type of the network device is not limited.

It should be noted that, in this embodiment of the present disclosure, for the terminal, TRPs may be identified by one of the following:
CORESETs or CORESET groups;
explicitly defined TRs;
transmission configuration indication (TCI) states, TCI state lists, or TCI state pools;
beam information or beam groups;
physical downlink control channel (PDCCH) scrambling identifiers (IDs) or PDCCH scrambling ID groups;
physical downlink shared channel (PDSCH) scrambling IDs or PDCCH scrambling ID groups;
PDCCH-config signaling elements; and
PDSCH-config signaling elements.

For example, when the TRPs are identified by the CORESETs, different TRPs correspond to different CORESETs. Therefore, for the terminal, the TRPs can be identified by the CORESETs. For another example, when the TRPs are identified by the TCI states, different TRPs correspond to different TCI states. Therefore, for the terminal, the TRPs can be identified by the TCI states. For another example, when the TRPs are identified by the PDCCH scrambling IDs, different TRPs correspond to different PDCCH scrambling IDs. Therefore, for the terminal, the TRPs can be identified by the PDCCH scrambling IDs. For another example, when the TRPs are identified by the PDSCH-config signaling elements, different TRPs correspond to different PDSCH-config signaling elements. Therefore, for the terminal, the TRPs can be identified by the PDSCH-config signaling elements.

Certainly, in this embodiment of the present disclosure, identifiers of the TRPs are not limited to at least one of the foregoing, but may alternatively be other resources, identifiers, or the like that can identify TRPs.

Figure 2:
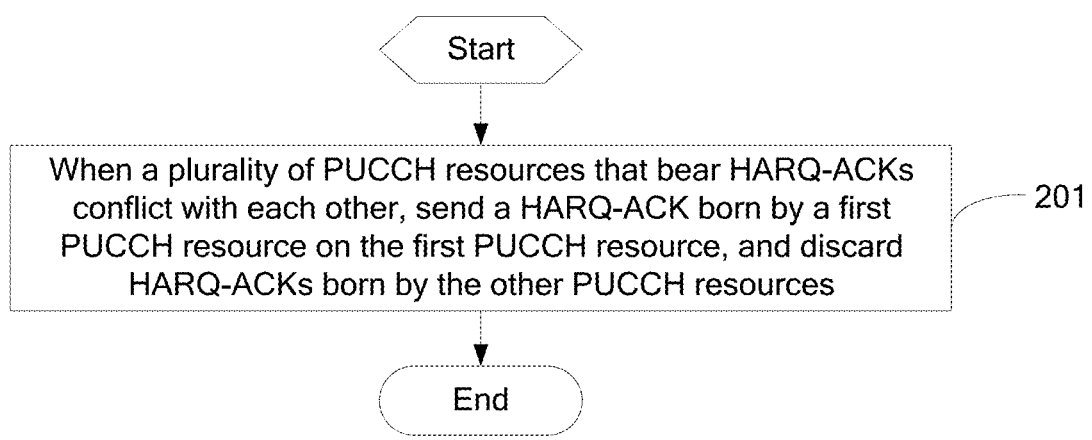
FIG. 2 is a flowchart of a HARQ-ACK sending method according to an embodiment of the present disclosure.

Referring to FIG. 2, FIG. 2 is a flowchart of a HARQ-ACK sending method according to an embodiment of the present disclosure. The method is applied to a terminal. As shown in FIG. 2, the method includes the following steps.

Step 201: When a plurality of PUCCH resources that bear HARQ-ACKs conflict with each other, send a HARQ-ACK born by a first PUCCH resource on the first PUCCH resource, and discard HARQ-ACKs born by remaining PUCCH resources, where
the first PUCCH resource is one of the plurality of PUCCH resources.

That the plurality of PUCCH resources that bear the HARQ-ACKs conflict with each other may be: the plurality of PUCCH resources are overlapped in time domain (for example, the plurality of PUCCH resources occupy at least one same orthogonal frequency division multiplex (OFDM) symbol), or the plurality of PUCCH resources are overlapped in both time domain and frequency domain, that is, time-frequency resources are overlapped.

The quantities of bits of HARQ-ACK codebooks born by all the plurality of PUCCH resources may be the same or different, or the quantities of bits of HARQ-ACK codebooks born by some PUCCH resources are the same, but the quantities of bits of HARQ-ACK codebooks born by the remaining PUCCH resources are different.

In addition, HARQ-ACKs born by different PUCCHs in the plurality of PUCCH resources are HARQ-ACKs born by PDSCHs of different TRPs. For example, the plurality of PUCCH resources include a PUCCH resource 1 and a PUCCH resource 2, where a HARQ-ACK born by the PUCCH resource 1 is a HARQ-ACK born by a PDSCH of a TRP 1; a HARQ-ACK born by the PUCCH resource 2 is a HARQ-ACK born by a PDSCH of a TRP 2; and HARQ-ACKs born by two PUCCH resources may correspond to PDSCHs of two TRPs, respectively. Certainly, in some embodiments, HARQ-ACKs born by some PUCCH resources may alternatively be HARQ-ACKs born by PDSCHs of a plurality of TRPs.

Therefore, in this embodiment of the present disclosure, the TRPs corresponding to the PUCCH resources may be TRPs sent on PDSCHs corresponding to the HARQ-ACKs born by the PUCCH resource. Certainly, this is not limited in the embodiments of the present disclosure. For example, as mentioned above, for the terminal, the TRPs can be identified by the PDCCH scrambling IDs. Therefore, the TRPs corresponding to the PUCCH resources may be the TRPs corresponding to the PDCCH scrambling IDs of the PUCCH resources. For another example, for the terminal, the TRPs can be identified by the TCI states. Therefore, the TRPs corresponding to the PUCCH resources may be the TRPs corresponding to the TCI states of the PUCCH resources. Other examples are not listed herein. Further, the TRPs corresponding to the PUCCH resources may alternatively be TRPs corresponding to PUCCH resource sets that the PUCCH resources belong to. For example, each TRP is configured with a respective PUCCH resource set; and the terminal determines a respective PUCCH resource among these PUCCH resource sets, thereby determining the relationships between the PUCCH resources and the TRPs.

In addition, the discarding HARQ-ACKs born by the remaining PUCCH resources may be: skipping sending the HARQ-ACKs born by the remaining PUCCH resources.

In the foregoing step, because the HARQ-ACK born by the first PUCCH resource is sent on the first PUCCH resource, the terminal can be prevented from synchronously sending HARQ-ACKs born by a plurality of PUCCH resources, so that a network device can detect and identify the sent HARQ-ACKs born by the PUCCH resources. For example, when the terminal determines that two PUCCH resources that bear HARQ-ACKs conflict with each other, the terminal sends only one HARQ-ACK on a respective PUCCH, and discards the other HARQ-ACK.

As an optional implementation, a TRP corresponding to the first PUCCH resource includes a TRP with the highest priority among the TRPs corresponding to the plurality of PUCCH resources.

The TRPs corresponding to the plurality of PUCCH resources may be TRPs corresponding to the plurality of PUCCH resources respectively. Further, the TRPs corresponding to the plurality of PUCCH resources may be a TRP set corresponding to the plurality of PUCCH resources. In addition, each TRP corresponding to one PUCCH resource may be one TRP or a plurality of TRPs, and the quantities of TRPs corresponding to different PUCCH resources may be the same or different.

In this embodiment of the present disclosure, priorities of TRPs may be agreed in advance or indicated by a network. Further, the priorities of the TRPs may be priorities of IDs of the TRPs. Therefore, the first PUCCH resource can be determined based on an ID of a TRP, for example, a PUCCH resource corresponding to a PDSCH that sends a TRP whose ID priority is relatively high. The IDs of the TRPs may be explicit indicators or indicators determined in other manners.

In the implementation, sending of a HARQ-ACK born by a PUCCH resource corresponding to a TRP whose priority is the highest can be implemented, thereby guaranteeing transmission of data with a high priority.

As an optional implementation, a control resource set (CORESET) corresponding to the first PUCCH resource is a CORESET with the highest priority among CORESETs corresponding to the plurality of PUCCH resources;

the CORESET corresponding to the first PUCCH resource is a CORESET whose value of a configuration list for K0, configuration list for K1, or configuration list for K2 is the smallest among the CORESETs corresponding to the plurality of PUCCH resources; or the CORESET corresponding to the first PUCCH resource is a CORESET whose value of a configuration list for K0, configuration list for K1, or configuration list for K2 is the largest among the CORESETs corresponding to the plurality of PUCCH resources.

The CORESETs corresponding to the plurality of PUCCH resources may be CORESETs corresponding to the plurality of PUCCH resources respectively. Further, the CORESETs corresponding to the plurality of PUCCH resources may be a CORESET set corresponding to the plurality of PUCCH resources.

In the implementation, sending and discarding can be implemented based on the CORESETs corresponding to the PUCCHs.

Priorities of the CORESETs may be defined in advance or configured by the network device. For example, the priorities of the CORESETs are determined based on IDs of the CORESETs.

The CORESETs corresponding to the PUCCH resources may be CORESETs used for configuring or scheduling the PUCCH resources, for example, CORESETs that resources for transmitting configuration information or scheduling information of the PUCCH resources belong to. In this case, in the implementation, sending of a HARQ-ACK born by a PUCCH resource configured or scheduled by a CORESET with a high priority can be implemented.

Alternatively, the CORESETs corresponding to the PUCCH resources may be CORESETs that scheduling PDSCHs belong to. Generally, downlink control information (DCI) of the scheduling PDSCHs indicate timing information that PUCCH resources fed back by scheduling HARQ-ACKs belong to.

In addition, in the implementation, configuration parameters of each CORESET may include a configuration list for K0, a configuration list for K1, or a configuration list for K2. That the value of the configuration list for K0 is the smallest may be: the average value of the configuration list for K0, the largest value of the configuration list for K0, the smallest value of the configuration list for K0, or the like is the smallest. For details about that the values of the configuration list for K1 and the configuration list for K2 are the smallest, see that the value of the configuration list for K0 is the smallest. Details are not described herein again.

That the value of the configuration list for K0 or configuration list for K1 is the smallest indicates that a PDSCH scheduled by a CORESET is relatively urgent. For example, that the value of the configuration list for K0 or configuration list for K1 is relatively small indicates that the PDSCH scheduled by the CORESET is relatively urgent, for example, an ultra-reliable low-latency communication (URLLC) service, thereby sending a corresponding HARQ-ACK for feedback to ensure HARQ-ACK feedback of an urgent service. That the value of the configuration list for K2 is the smallest indicates that a physical uplink shared channel (PUSCH) scheduled by the CORESET is relatively urgent.

In the foregoing implementation, HARQ-ACK born on a PUCCH resource corresponding to which CORESET is to be sent can be determined based on related configuration of the CORESET.

It should be noted that the foregoing description of one of the configuration list for K0, configuration list for K1 and configuration list for K2 for comparison to determine the first PUCCH resource is only an optional solution. Alternatively, in this embodiment of the present disclosure, two or more of the configuration list for K0, configuration list for K1 and configuration list for K2 may be comprehensively considered. For example, the CORESET corresponding to the first PUCCH resource is such a CORESET, among the plurality of CORESETs corresponding to the plurality of PUCCH resources, that at least one of values of its configuration list for K0, configuration list for K1, or configuration list for K2 is the smallest or largest. That is, in this embodiment of the present disclosure, the CORESET corresponding to the first PUCCH resource may be determined based on the smallest value or largest value in at least one of a configuration list for K0, configuration list for K1, or configuration list for K2 of each CORESET.

It should be noted that, in this embodiment of the present disclosure, K0 may be the quantity of slot offsets between a PDSCH and a PDCCH that is indicated by a time domain resource assignment field in downlink DCI, where the quantity of slots is configured based on a value of the PDSCH (numerology);

K1 may be the quantity of slot offsets between a PUCCH and a PDSCH that is obtained based on a PDSCH-to-HARQ feedback timing indicator or a high-layer parameter (dl-Data To UL-ACK) in downlink DCI and that is used for feeding back a HARQ-ACK; and K2 may be the quantity of slot offsets between a PUSCH and a PDCCH that is indicated by a time domain resource assignment field in uplink DCI, where the quantity of slots may be configured based on a value of the PUSCH (numerology).

As an optional implementation, the foregoing first PUCCH resource is:
  a PUCCH resource by which the largest quantity of acknowledgements (ACK) are sent among the plurality of PUCCH resources; or
  a PUCCH resource whose quantity of ACK bits has the highest proportion to all the HARQ-ACK bits among the plurality of PUCCH resources.

In the implementation, sending of a HARQ-ACK born by a PUCCH resource that sends the largest quantity of ACKs or that sends the highest proportion of ACK bits to all the HARQ-ACK bits among the plurality of PUCCH resources can be implemented. For example, when the quantity of ACKs or the proportion of ACK bits to all bits of a HARQ-ACK fed back by a TRP 1 in the HARQ-ACK is greater than that of a HARQ-ACK fed back by a TRP 2, the HARQ-ACK fed back by the TRP 1 is sent. In this way, PDSCHs transmitted correctly can be prevented from being retransmitted as far as possible, so as to avoid reduction of transmission efficiency. Otherwise, a network device may schedule retransmission if it does not receive any ACKs.

Certainly, in this embodiment of the present disclosure, the first PUCCH resource may also be a PUCCH resource, among the plurality of PUCCH resources, that has the largest proportion of ACKs to negative-acknowledgements (NACK). For example, when the ACK-to-NACK proportion of the HARQ-ACK fed back by the TRP 1 is larger than that of the HARQ-ACK fed back by the TRP 2, the HARQ-ACK fed back by the TRP 1 is sent. In this way, PDSCHs transmitted correctly can be prevented from being retransmitted as far as possible, so as to avoid reduction of transmission efficiency.

As an optional implementation, the TRP corresponding to the first PUCCH resource corresponds to a quantity of conflicts;

The quantity of conflicts may be a quantity of current conflicts. For example, the conflict in step 201 is an $n^{th}$ conflict.

That the TRP corresponding to the first PUCCH resource corresponds to the quantity of conflicts may be that the TRP corresponding to the first PUCCH resource is determined based on the quantity of conflicts. That is, the TRP corresponding to the first PUCCH resource is related to the quantity of conflicts of PUCCH resources that transmit HARQ-ACKs. Optionally, discarding is performed in turn based on IDs of TRPs. For example, if the HARQ-ACK of the TRP 1 is discarded when an $n^{th}$ conflict occurs, the HARQ-ACK of the TRP 2 is discarded when an $n+1^{th}$ conflict occurs, and so on.

As an optional implementation, the TRP corresponding to the first PUCCH resource corresponds to a time slot number.

The time slot number may be the number of a time slot when the conflict in step 201 occurs, or a time slot number of the HARQ-ACK that feeds back the conflict in step 201, that is, a time slot number of the HARQ-ACK born by the plurality of PUCCH resources. Therefore, in the implementation, whether to send or discard a HARQ-ACK corresponding to an agreed TRP can be determined based on a time slot number of a feedback HARQ-ACK. For example, if the time slot number of the feedback HARQ-ACK is odd, the HARQ-ACK corresponding to the TRP 1 is sent, and the HARQ-ACK corresponding to the TRP 2 is discarded. If the time slot number of the feedback HARQ-ACK is even, the HARQ-ACK corresponding to the TRP 2 is sent, and the HARQ-ACK corresponding to the TRP 1 is discarded.

As an optional implementation, the first PUCCH resource may alternatively be determined based on parameters of downlink transmission resources. The parameters may include priorities of the downlink transmission resources. For example, the first PUCCH resource is a PUCCH resource with a downlink transmission resource having the highest priority among the plurality of PUCCH resources. The downlink transmission resources may be any one of PDSCHs, transport blocks (TB), spatial bundling of transport blocks, and code block groups (CBG).

Alternatively, the parameters may include the K0 or K1 value for the downlink transmission resources, or the K0 or K1 value for the PDSCHs.

The following uses priorities of the downlink transmission resources as an example. Optionally, the first PUCCH resource may be:
  a PUCCH resource, among the plurality of PUCCH resources, that bears a HARQ-ACK corresponding to at least one downlink transmission resource, where the at least one downlink transmission resource includes the largest quantity of downlink transmission resources having a first priority; or
  a PUCCH resource, among the plurality of PUCCH resources, that bears a HARQ-ACK corresponding to at least one downlink transmission resource, where the at least one downlink transmission resource includes downlink transmission resources having the first priority, and the downlink transmission resources having the first priority has the largest proportion of all downlink transmission resources, where
  the first priority is the highest priority.

In the implementation, the HARQ-ACK born by each PUCCH resource corresponds to at least one downlink transmission resource, and quantities of downlink transmission resources to which HARQ-ACKs born by different PUCCH resources correspond may be the same or different.

That the first priority is the highest priority may be that it is the highest priority of all downlink transmission resources corresponding to the HARQ-ACKs born by in the plurality of PUCCH resources. Alternatively, that the first priority is the highest priority may be that it is the highest priority defined in the protocol, or the highest priority on which the network device and the terminal agree in advance.

In addition, the priorities of the downlink transmission resources may be indicated during scheduling, or may be determined based on service types of the downlink transmission resources. For example, a PDSCH of a URLLC service has a higher priority than a PDSCH of an enhanced Mobile Broadband (eMBB) service.

In the foregoing implementation, sending of a HARQ-ACK born by a PUCCH resource with the largest quantity of first-priority downlink transmission resources can be implemented, or sending of a HARQ-ACK born by a PUCCH resource with the largest proportion of first-priority downlink transmission resources to all downlink transmission resources can be implemented. For example, when the proportion of first-priority downlink transmission resources, to all the downlink transmission resources, of a PDSCH corresponding to the HARQ-ACK fed back by the TRP 1 is larger than that of a PDSCH corresponding to the HARQ-ACK fed back by the TRP 2, the HARQ-ACK born by the PUCCH resource of the TRP1 is sent. In this way, a HARQ-ACK of a downlink transmission resource with a high priority is fed back as far as possible to further improve the HARQ-ACK feedback performance of the terminal.

Certainly, in this embodiment of the present disclosure, priority implementations are not limited to the foregoing two implementations. For example, when the downlink transmission resources corresponding to the HARQ-ACKs born by the plurality of PUCCH resources include the first-priority downlink transmission resources and second-priority downlink transmission resources, the first PUCCH resource may alternatively be a PUCCH resource meeting the following requirement among the plurality of PUCCH resources: a HARQ-ACK born by the PUCCH resource corresponds to at least one downlink transmission resource, and a quantity of first-priority downlink transmission resources of the at least one downlink transmission resource to a quantity of second-priority downlink transmission resources of the at least one downlink transmission resource is the highest. The second priority is lower than the first priority.

That the foregoing parameters include the K0 or K1 value corresponding to the PDSCHs is used as an example. Optionally, the first PUCCH resource may be:
  a PUCCH resource, among the plurality of PUCCH resources, that bears a HARQ-ACK corresponding to at least one PDSCH, where the at least one PDSCH corresponds to the smallest K0 or K1 value; or
  a PUCCH resource, among the plurality of PUCCH resources, that bears a HARQ-ACK corresponding to at least one PDSCH, where the at least one PDSCH corresponds to the largest K0 or K1 value.

The K0 or K1 value corresponding to the PDSCHs may be the K0 or K1 value indicated by DCI for scheduling the PDSCHs.

In this implementation, sending of a PUCCH resource with the smallest K0 or K1 value can be implemented to ensure the HARQ-ACK feedback of an urgent service, so as to further improve the HARQ-ACK feedback performance of the terminal. Sending of the PUCCH resource with the smallest K0 or K1 value makes the terminal to feed back HARQ-ACKs more flexibly.

It should be noted that the PUCCH resource with the smallest or largest K0 or K1 value is only an optional implementation, which is not limited in the embodiments of the present disclosure. For example: the first PUCCH resource may alternatively be determined by the smallest or largest K0 or K1 value that is indicated by DCI scheduling a PDSCH corresponding to a HARQ-ACK.

According to the HARQ-ACK sending method provided in this embodiment of the present disclosure, because the HARQ-ACK born by the first PUCCH resource is sent on the first PUCCH resource, the terminal can be prevented from synchronously sending HARQ-ACKs born by a plurality of PUCCH resources, so that a network device can detect and identify the sent HARQ-ACKs born by the PUCCH resources, and the HARQ-ACK feedback performance of the terminal can be improved.

Figure 3:
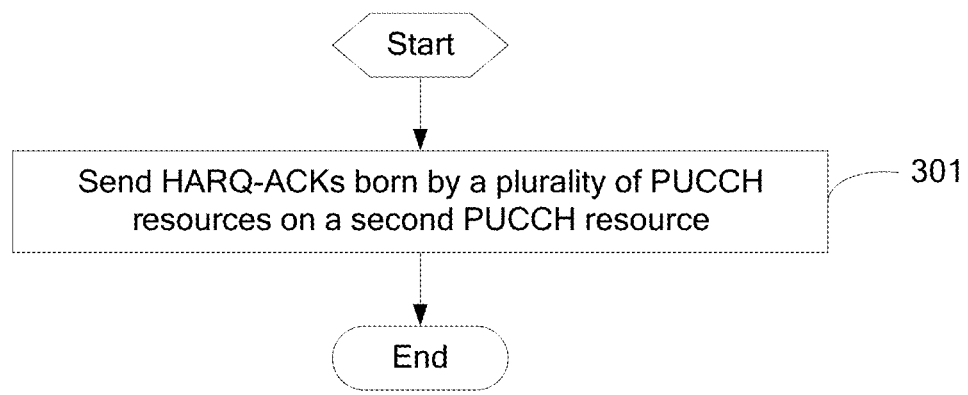
FIG. 3 is a flowchart of another HARQ-ACK sending method according to an embodiment of the present disclosure.

Referring to FIG. 3, FIG. 3 is a flowchart of a HARQ-ACK sending method according to an embodiment of the present disclosure. The method is applied to a terminal. As shown in FIG. 3, the method includes the following steps.

Step 301: Send HARQ-ACKs born by a plurality of PUCCH resources on a second PUCCH resource, where the second PUCCH resource is a PUCCH resource different from the plurality of PUCCH resources, the plurality of PUCCH resources that do not conflict with each other, or a PUCCH resource.

Optionally, when the plurality of PUCCH resources conflict with each other, the second PUCCH resource is a PUCCH resource different from the plurality of PUCCH resources. In this way, a case that all HARQ-ACKs born by the plurality of PUCCH resources fail to be sent can be avoided, thereby improving the HARQ-ACK feedback performance of the terminal.

As an optional implementation, the HARQ-ACKs sent on the second PUCCH resource include:
  a joint HARQ-ACK codebook composed of a plurality of HARQ-ACK codebooks;
  a plurality of HARQ-ACK codebooks; or
  one HARQ-ACK codebook, where
  the one HARQ-ACK codebook or each of the plurality of HARQ-ACK codebooks is used to represent a HARQ-ACK born by a PUCCH resource corresponding to the HARQ-ACK codebook, and the one HARQ-ACK codebook or the plurality of HARQ-ACK codebooks are semi-static or dynamic codebooks and correspond to a plurality of downlink transmission resources from the same or different TRPs.

The plurality of downlink transmission resources from the same or different TRPs may correspond to a same HARQ-ACK codebook.

Optionally, an order of the plurality of HARQ-ACK codebooks of the joint HARQ-ACK codebook in the joint HARQ-ACK codebook is related to an order of a plurality of TRPs corresponding to the plurality of HARQ-ACK codebooks.

The order of the plurality of TRPs may be an order of IDs of the TRPs, for example, from small to large, from large to small, or a priority order. This is not limited in this embodiment of the present disclosure. That the order of the plurality of HARQ-ACK codebooks is related to the order of the plurality of TRPs corresponding to the plurality of HARQ-ACK codebooks may be that the order of the plurality of HARQ-ACK codebooks is a specific order of the plurality of TRPs corresponding to the plurality of HARQ-ACK codebooks, for example, from small to large, from large to small, or a priority order.

It should be noted that after receiving the first HARQ-ACK codebook, a network device may also determine a HARQ-ACK of each TRP according to the foregoing order. No additional signaling is required to indicate the HARQ-ACK of each TRP. Therefore, transmission resources can be saved.

Further, independent channel coding is performed on the plurality of HARQ-ACK codebooks of the joint HARQ-ACK codebook; and code rates for channel coding of the plurality of HARQ-ACK codebooks are the same or different, and are mapped to the joint HARQ-ACK codebook according to the order; or
  the plurality of HARQ-ACK codebooks of the joint HARQ-ACK codebook are mapped to the joint HARQ-ACK codebook according to the order, and channel coding is performed on the joint HARQ-ACK codebook.

The independent channel encoding may be: performing channel encoding on each HARQ-ACK codebook at its code rate, mapping the plurality of HARQ-ACK codebooks to the first HARQ-ACK codebook according to the order, and performing sending on the second PUCCH resource.

The channel coding performed on the joint HARQ-ACK codebook may be: mapping the plurality of HARQ-ACK codebooks to the first HARQ-ACK codebook according to the order, performing channel coding once at a certain code rate, and performing sending on the second PUCCH resource.

Optionally, if one of the plurality of HARQ-ACK codebooks is a dynamic codebook, a downlink assignment index (DAI) of the HARQ-ACK codebook is counted independently based on a TRP corresponding to the HARQ-ACK codebook or integrally counted based on all TRPs, and the all TRPs are all TRPs corresponding to the plurality of HARQ-ACK codebooks.

The independent counting may be performed when backhaul between TRPs is non-ideal, and the integral counting may be performed when the backhaul between the TRPs is ideal.

Optionally, the independent counting manner or integral counting manner of the DAI is configured by a high layer, for example, radio resource control (RRC) signaling configuration.

That is, whether the DAI adopts the independent counting manner or the integral counting manner is configured by the high layer. In this way, DAIS can be counted more flexibly.

It should be noted that when dynamic HARQ-ACK codebooks are used, in order to prevent inconsistency of HARQ-ACK bit quantities considered by a receiving party and a sending party due to the terminal's failure to correctly detect scheduled PDCCHs, the network device contains a downlink assignment index (DAI) in the DCI, where the DAI can be divided into two parts: a counter DAI and a total DAI in carrier aggregation. The counter DAI indicates the quantity of downlink transmissions scheduled before the DCI, and the total DAI indicates the total quantity of downlink transmissions scheduled in all carriers before the DCI.

In this implementation, a DAI of each dynamic codebook is counted independently of its corresponding TRP or counted together with all TRPs. Therefore, transmission accuracy of a dynamic HARQ-ACK codebook for each TRP can be guaranteed.

As an optional implementation, the HARQ-ACK sent on the second PUCCH resource has at least one of the following characteristics:

in a same carrier, downlink transmission resources having a same HARQ process ID correspond to one bit in the HARQ-ACK codebook; and in a same carrier, downlink transmission resources having different HARQ process IDs correspond to different bits in the HARQ-ACK codebook, and an order of the bits in the HARQ-ACK codebook is related to the HARQ process IDs and an index of the carrier.

The downlink transmission resources may be any one of PDSCHs, TBs, spatial bundling of transport blocks, and CBGs. The carrier may be a carrier to which the downlink transmission resources belong to, for example, a component carrier (CC) or cell ID in carrier aggregation (CA).

The foregoing order may be agreed between the network device and the terminal in advance, defined by a protocol in advance, or the like. This is not limited in this embodiment of the present disclosure.

In the implementation, it can be realized that in the same carrier, when a plurality of downlink transmission resources corresponding to one HARQ-ACK feedback have the same HARQ process ID, they correspond to one HARQ-ACK bit. Bits in HARQ-ACK codebooks corresponding to a plurality of downlink transmission resources having different HARQ process IDs are arranged in an order of HARQ process IDs or indexes of component carriers (CCs for short, especially in CA scenario).

It should be noted that if a plurality of downlink transmission resources scheduled by one or more TRPs (for example, ideal backhaul) in the same carrier indicate HARQ-ACK feedbacks of the same time slot, and the plurality of downlink transmission resources have the same HARQ process ID, the plurality of downlink transmission resources are repeated transmission of the same data. In this case, the plurality of downlink transmission resources that have the same HARQ process ID correspond to one HARQ-ACK bit, thereby reducing transmission overheads.

In addition, in this embodiment of the present disclosure, the value of a HARQ-ACK bit may be determined in the following two manners:

Manner I: The terminal independently receives (demodulates and decodes) a plurality of downlink transmission resources having the same HARQ process ID. The value of the bit corresponds to ACK, provided that one downlink transmission resource corresponds to ACK. Otherwise, all the downlink transmission resources correspond to NACK, and the value of the bit corresponds to NACK.

Manner II: The plurality of downlink transmission resources having the same HARQ process ID are received in a combined manner. If it is determined that the downlink transmission resources correspond to ACK after the combination and receiving, the value of the bit corresponds to ACK. Otherwise, the value of the bit corresponds to NACK.

In this embodiment of the present disclosure, such method can reduce transmission overheads, thereby improving the HARQ-ACK feedback performance of the terminal.

Figure 4:
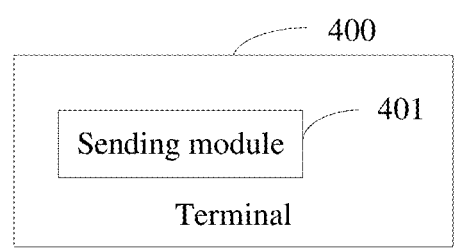
FIG. 4 is a structural diagram of a terminal according to an embodiment of the present disclosure.

Referring to FIG. 4, FIG. 4 is a structural diagram of a terminal according to an embodiment of the present disclosure. As shown in FIG. 4, the terminal 400 includes:

a sending module 401, configured to: when a plurality of PUCCH resources that bear HARQ-ACKs conflict with each other, send a HARQ-ACK born by a first PUCCH resource on the first PUCCH resource, and discard HARQ-ACKs born by remaining PUCCH resources, where the first PUCCH resource is one of the plurality of PUCCH resources.

Optionally, a TRP corresponding to the first PUCCH resource includes a TRP with the highest priority among the TRPs corresponding to the plurality of PUCCH resources.

Optionally, a CORESET corresponding to the first PUCCH resource includes a CORESET with the highest priority among CORESETs corresponding to the plurality of PUCCH resources;

the CORESET corresponding to the first PUCCH resource includes a CORESET whose value of a configuration list for K0, configuration list for K1, or configuration list for K2 is the smallest among the CORESETs corresponding to the plurality of PUCCH resources; or the CORESET corresponding to the first PUCCH resource includes a CORESET whose value of a configuration list for K0, configuration list for K1, or configuration list for K2 is the largest among the CORESETs corresponding to the plurality of PUCCH resources.

Optionally, the first PUCCH resource is:

a PUCCH resource by which the largest quantity of acknowledgements (ACK) are sent among the plurality of PUCCH resources; or a PUCCH resource whose quantity of ACK bits has the highest proportion to all the HARQ-ACK bits among the plurality of PUCCH resources.

Optionally, the TRP corresponding to the first PUCCH resource corresponds to a quantity of conflicts; or the TRP corresponding to the first PUCCH resource corresponds to a time slot number.

Optionally, the first PUCCH resource is:

a PUCCH resource, among the plurality of PUCCH resources, that bears a HARQ-ACK corresponding to at least one downlink transmission resource, where the at least one downlink transmission resource includes the largest quantity of downlink transmission resources having a first priority; or a PUCCH resource, among the plurality of PUCCH resources, that bears a HARQ-ACK corresponding to at least one downlink transmission resource, where the at least one downlink transmission resource includes downlink transmission resources having the first priority, and the downlink transmission resources having the first priority has the largest proportion of all downlink transmission resources, where the first priority is the highest priority.

Optionally, the first PUCCH resource is:

a PUCCH resource, among the plurality of PUCCH resources, that bears a HARQ-ACK corresponding to at least one PDSCH, where the at least one PDSCH corresponds to the smallest K0 or K1 value; or a PUCCH resource, among the plurality of PUCCH resources, that bears a HARQ-ACK corresponding to at least one PDSCH, where the at least one PDSCH corresponds to the largest K0 or K1 value.

The terminal provided in this embodiment of the present disclosure can implement each process implemented by the terminal in the method embodiment of FIG. 2. To avoid repetition, details are not described herein again. The terminal can be prevented from synchronously sending HARQ-ACKs born by a plurality of PUCCH resources, so that a network device can detect and identify the sent HARQ-ACKs born by the PUCCH resources, thereby improving the HARQ-ACK feedback performance of the terminal.

Figure 5:
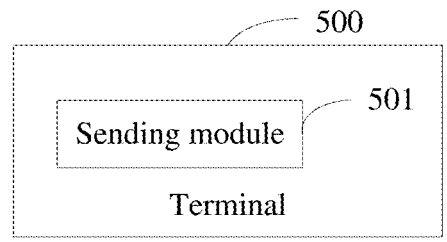
FIG. 5 is a structural diagram of another terminal according to an embodiment of the present disclosure.

Referring to FIG. 5, FIG. 5 is a structural diagram of another terminal according to an embodiment of the present disclosure. As shown in FIG. 5, the terminal 500 includes:

a sending module 501, configured to send HARQ-ACKs born by a plurality of PUCCH resources on a second PUCCH resource, where the second PUCCH resource is a PUCCH resource different from the plurality of PUCCH resources, the plurality of PUCCH resources that do not conflict with each other, or a PUCCH resource.

Optionally, the HARQ-ACKs sent on the second PUCCH resource include:

a joint HARQ-ACK codebook composed of a plurality of HARQ-ACK codebooks;

a plurality of HARQ-ACK codebooks; or one HARQ-ACK codebook, where the one HARQ-ACK codebook or each of the plurality of HARQ-ACK codebooks is used to represent a HARQ-ACK born by a PUCCH resource corresponding to the HARQ-ACK codebook, and the one HARQ-ACK codebook or the plurality of HARQ-ACK codebooks are semi-static or dynamic codebooks and correspond to a plurality of downlink transmission resources from the same or different TRPs.

Optionally, an order of the plurality of HARQ-ACK codebooks of the joint HARQ-ACK codebook in the joint HARQ-ACK codebook is related to an order of a plurality of TRPs corresponding to the plurality of HARQ-ACK codebooks.

Optionally, independent channel coding is performed on the plurality of HARQ-ACK codebooks of the joint HARQ-ACK codebook; and code rates for channel coding of the plurality of HARQ-ACK codebooks are the same or different, and are mapped to the joint HARQ-ACK codebook according to the order; or the plurality of HARQ-ACK codebooks of the joint HARQ-ACK codebook are mapped to the joint HARQ-ACK codebook according to the order, and channel coding is performed on the joint HARQ-ACK codebook.

Optionally, if one of the plurality of HARQ-ACK codebooks is a dynamic codebook, a downlink assignment index (DAI) of the HARQ-ACK codebook is counted independently based on a TRP corresponding to the HARQ-ACK codebook or integrally counted based on all TRPs, and all the TRPs are all TRPs corresponding to the plurality of HARQ-ACK codebooks.

Optionally, the independent counting manner or integral counting manner of the DAI is configured by a high layer.

Optionally, the HARQ-ACK sent on the second PUCCH resource has at least one of the following characteristics:

in a same carrier, downlink transmission resources having a same HARQ process ID correspond to one bit in the HARQ-ACK codebook; and in a same carrier, downlink transmission resources having different HARQ process IDs correspond to different bits in the HARQ-ACK codebook, and an order of the bits in the HARQ-ACK codebook is related to the HARQ process IDs and an index of the carrier.

The terminal provided in this embodiment of the present disclosure can implement each process implemented by the terminal in the method embodiment of FIG. 3. To avoid repetition, details are not described herein again. Transmission overheads can be reduced, thereby improving the HARQ-ACK feedback performance of the terminal.

Figure 6:
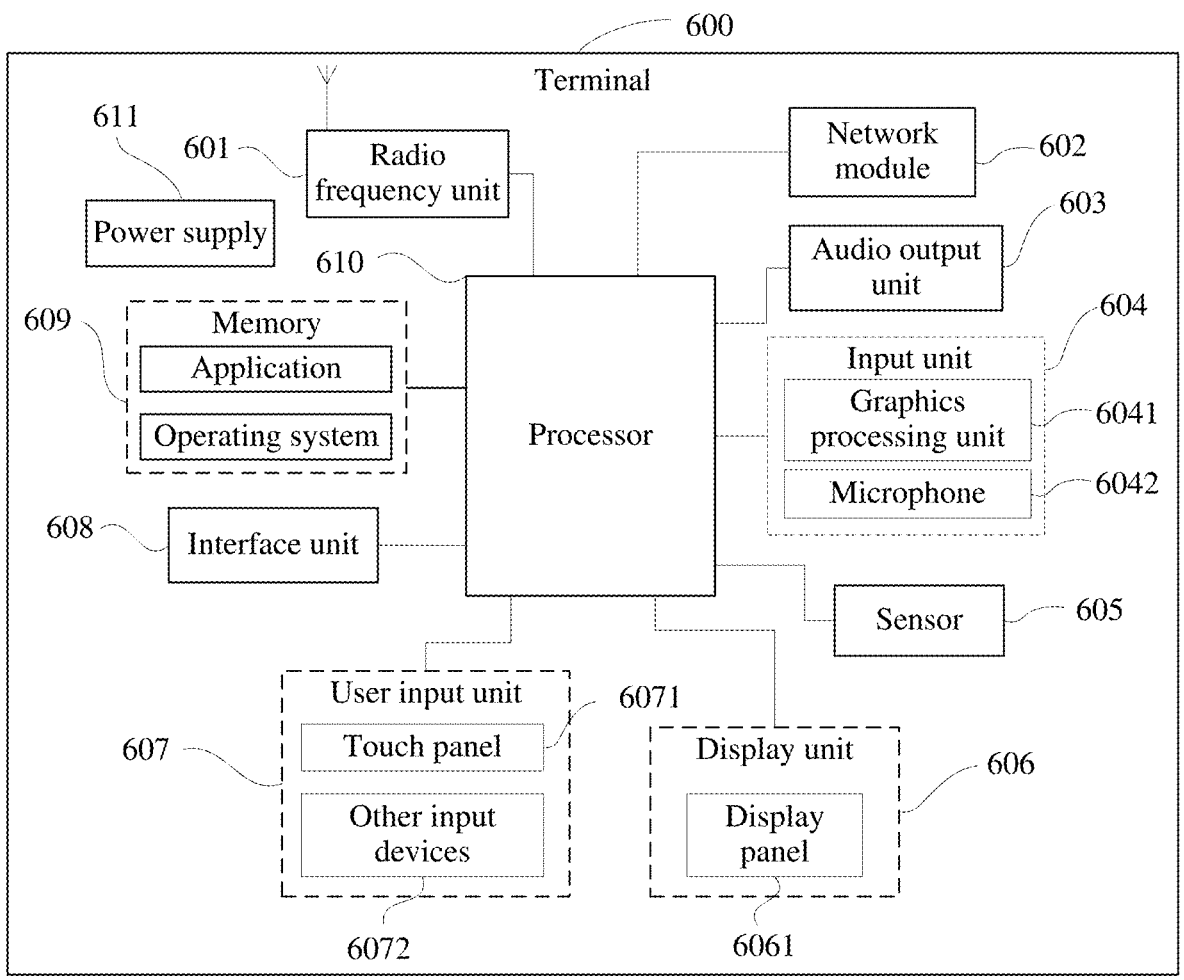
FIG. 6 is a structural diagram of another terminal according to an embodiment of the present disclosure.

FIG. 6 is a schematic diagram of a hardware structure of a terminal according to the embodiments of the present disclosure.

The terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, and a power supply 611. Those skilled in the art may understand that the terminal structure shown in FIG. 6 does not constitute a limitation to the terminal. The terminal may include more or fewer components than those shown in the figure, or some components may be combined, or there may be a different component arrangement. In the embodiments of the present disclosure, the terminal includes but is not limited to a mobile phone, a tablet computer, a notebook computer, a palmtop computer, a vehicle-mounted terminal, a wearable device, and a pedometer.

In an embodiment, the radio frequency unit 601 is configured to: when a plurality of PUCCH resources that bear HARQ-ACKs conflict with each other, send a HARQ-ACK born by a first PUCCH resource on the first PUCCH resource, and discard HARQ-ACKs born by remaining PUCCH resources, where the first PUCCH resource is one of the plurality of PUCCH resources.

Optionally, a TRP corresponding to the first PUCCH resource includes a TRP with the highest priority among the TRPs corresponding to the plurality of PUCCH resources.

Optionally, a CORESET corresponding to the first PUCCH resource includes a CORESET with the highest priority among CORESETs corresponding to the plurality of PUCCH resources; or the CORESET corresponding to the first PUCCH resource includes a CORESET whose value of a configuration list for K0, configuration list for K1, or configuration list for K2 is the smallest among the CORESETs corresponding to the plurality of PUCCH resources; or the CORESET corresponding to the first PUCCH resource includes a CORESET whose value of a configuration list for K0, configuration list for K1, or configuration list for K2 is the largest among the CORESETs corresponding to the plurality of PUCCH resources.

Optionally, the first PUCCH resource is:

a PUCCH resource by which the largest quantity of acknowledgements (ACK) are sent among the plurality of PUCCH resources; or a PUCCH resource whose quantity of ACK bits has the highest proportion to all the HARQ-ACK bits among the plurality of PUCCH resources.

Optionally, the TRP corresponding to the first PUCCH resource corresponds to a quantity of conflicts; or the TRP corresponding to the first PUCCH resource corresponds to a time slot number.

Optionally, the first PUCCH resource is:

a PUCCH resource, among the plurality of PUCCH resources, that bears a HARQ-ACK corresponding to at least one downlink transmission resource, where the at least one downlink transmission resource includes the largest quantity of downlink transmission resources having a first priority; or a PUCCH resource, among the plurality of PUCCH resources, that bears a HARQ-ACK corresponding to at least one downlink transmission resource, where the at least one downlink transmission resource includes downlink transmission resources having the first priority, and the downlink transmission resources having the first priority has the largest proportion of all downlink transmission resources, where the first priority is the highest priority.

Optionally, the first PUCCH resource is:

a PUCCH resource, among the plurality of PUCCH resources, that bears a HARQ-ACK corresponding to at least one PDSCH, where the at least one PDSCH corresponds to the smallest K0 or K1 value; or a PUCCH resource, among the plurality of PUCCH resources, that bears a HARQ-ACK corresponding to at least one PDSCH, where the at least one PDSCH corresponds to the largest K0 or K1 value.

The foregoing terminal can be prevented from synchronously sending HARQ-ACKs born by a plurality of PUCCH resources, so that a network device can detect and identify the sent HARQ-ACKs born by the PUCCH resources, thereby improving the HARQ-ACK feedback performance of the terminal.

In another embodiment, the radio frequency unit 601 is configured to send HARQ-ACKs born by a plurality of PUCCH resources on a second PUCCH resource, where the second PUCCH resource is a PUCCH resource different from the plurality of PUCCH resources, the plurality of PUCCH resources that do not conflict with each other, or a PUCCH resource.

Optionally, the HARQ-ACKs sent on the second PUCCH resource include:

a joint HARQ-ACK codebook composed of a plurality of HARQ-ACK codebooks;

a plurality of HARQ-ACK codebooks; or one HARQ-ACK codebook, where the one HARQ-ACK codebook or each of the plurality of HARQ-ACK codebooks is used to represent a HARQ-ACK born by a PUCCH resource corresponding to the HARQ-ACK codebook, and the one HARQ-ACK codebook or the plurality of HARQ-ACK codebooks are semi-static or dynamic codebooks and correspond to a plurality of downlink transmission resources from the same or different TRPs.

Optionally, an order of the plurality of HARQ-ACK codebooks of the joint HARQ-ACK codebook in the joint HARQ-ACK codebook is related to an order of a plurality of TRPs corresponding to the plurality of HARQ-ACK codebooks.

Optionally, independent channel coding is performed on the plurality of HARQ-ACK codebooks of the joint HARQ-ACK codebook; and code rates for channel coding of the plurality of HARQ-ACK codebooks are the same or different, and are mapped to the joint HARQ-ACK codebook according to the order; or the plurality of HARQ-ACK codebooks of the joint HARQ-ACK codebook are mapped to the joint HARQ-ACK codebook according to the order, and channel coding is performed on the joint HARQ-ACK codebook.

Optionally, if one of the plurality of HARQ-ACK codebooks is a dynamic codebook, a downlink assignment index (DAI) of the HARQ-ACK codebook is counted independently based on a TRP corresponding to the HARQ-ACK codebook or integrally counted based on all TRPs, and the all TRPs are all TRPs corresponding to the plurality of HARQ-ACK codebooks.

Optionally, the independent counting manner or integral counting manner of the DAI is configured by a high layer.

Optionally, the HARQ-ACK sent on the second PUCCH resource has at least one of the following characteristics:

in a same carrier, downlink transmission resources having a same HARQ process ID correspond to one bit in the HARQ-ACK codebook; and in a same carrier, downlink transmission resources having different HARQ process IDs correspond to different bits in the HARQ-ACK codebook, and an order of the bits in the HARQ-ACK codebook is related to the HARQ process IDs and an index of the carrier.

The foregoing terminal can reduce transmission overheads, thereby improving the HARQ-ACK feedback performance of the terminal.

It should be understood that, in this embodiment of the present disclosure, the radio frequency unit 601 may be configured to receive and send signals in an information receiving and sending process or a calling process. For example, after receiving downlink data from a base station, the radio frequency unit 601 sends the downlink data to the processor 610 for processing, and sends uplink data to the base station. Generally, the radio frequency unit 601 includes but is not limited to: an antenna, at least one amplifier, a transceiver, a coupler, a low noise amplifier, and a duplexer. In addition, the radio frequency unit 601 may further communicate with a network and another device through wireless communication.

The terminal provides wireless broadband Internet access for the user by using the network module 602, for example, helping the user to send and receive an e-mail, browse a web page, and access streaming media.

The audio output unit 603 can convert audio data received by the radio frequency unit 601 or the network module 602 or stored in the memory 609 into an audio signal, and output the audio signal into sound. In addition, the audio output unit 603 may further provide audio output (for example, call signal receiving sound or message receiving sound) related to a specific function performed by the terminal 600. The audio output unit 603 includes a loudspeaker, a buzzer, a receiver, and the like.

The input unit 604 is configured to receive audio or radio frequency signals. The input unit 604 may include a graphics processing unit (GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frame processed by the graphics processing unit 6041 may be stored in the memory 609 (or another storage medium) or sent by using the radio frequency unit 601 or the network module 602. The microphone 6042 may receive a sound and can process such sound into audio data. The processed audio data can be converted, in a telephone call mode, into a format that can be sent by the radio frequency unit 601 to a mobile communications base station for output.

The terminal 600 further includes at least one sensor 605, for example, a light sensor, a motion sensor, and another sensor. For example, the light sensor includes an ambient light sensor and a proximity sensor, where the ambient light sensor can adjust brightness of a display panel 6061 based on brightness of ambient light, and the proximity sensor can turn off the display panel 6061 and/or backlight when the terminal 600 is moved towards the ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein again.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive input digit or character information, and generate key signal inputs related to user settings and function control of the terminal. Specifically, the user input unit 607 includes a touch panel 6071 and other input devices 6072. The touch panel 6071, also called a touch screen, can collect a touch operation of the user on or near the touch panel 6071 (for example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 610, receives a command sent by the processor 610, and executes the command. In addition, the touch panel 6071 can be implemented in various types such as resistive, capacitive, infrared, and surface acoustic waves. In addition to the touch panel 6071, the user input unit 607 may further include the other input devices 6072. Specifically, the another input device 6072 may include, but not limited to, a physical keyboard, a function key (for example, a volume control key or a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then, the processor 610 provides corresponding visual output on the display panel 6061 based on the type of the touch event. Although in FIG. 6, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of the mobile phone, and the like. In addition, memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and lines, and performs various functions of the terminal and processes data by running or executing software programs and/or modules stored in the memory 609 and invoking data stored in the memory 609, to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may also include a power supply 611 (for example, a battery) that supplies power to various components. Optionally, the power supply 611 may be logically connected to the processor 610 through a power supply management system, to perform functions of managing charging, discharging, and power consumption through the power supply management system.

In addition, the terminal 600 includes some functional modules not shown. Details are not described herein again.

Optionally, an embodiment of the present disclosure further provides a terminal, including a processor 610, a memory 609, and a computer program stored in the memory 609 and executable on the processor 610. When the computer program is executed by the processor 610, the processes in the embodiment of the HARQ-ACK sending method are implemented, and the same technical effect can be achieved. To avoid repetition, details are not described herein again.

An embodiment of the present disclosure further provide a non-transitory computer-readable storage medium. The non-transitory computer-readable storage medium stores a computer program, and when the computer program is executed by a processor, the processes in the embodiments of the HARQ-ACK sending method provided in the embodiments of the present disclosure are implemented, and the same technical effect can be achieved. To avoid repetition, details are not described herein again. The non-transitory computer-readable storage medium is, for example, a read-only memory (ROM), a random access memory (RAM), a magnetic disk, or an optical disk.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. Those skilled in the art may use different methods to implement the described functions for each specific application, but such implementation should not be considered as beyond the scope of the present disclosure.

Those skilled in the art can clearly understand that to describe conveniently and concisely, for a specific working process of the system, apparatus, and unit described above, refer to the corresponding process in the foregoing method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a non-transitory computer-readable storage medium. Based on such an understanding, the technical solutions of the present disclosure essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium includes various mediums, such as a USB flash disk, a removable hard disk, a ROM, a RAM, a magnetic disk, or an optical disc, that can store program code.

A person of ordinary skill in the art can understand that all or some of the procedures in the methods of the foregoing embodiments may be implemented by a computer program controlling related hardware. The program may be stored in a non-transitory computer-readable storage medium. When the program is executed, the procedures of the embodiments of the foregoing methods may be performed. The foregoing storage medium may include: a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For implementation with hardware, the processing unit can be implemented in one or more application specific integrated circuits (ASIC), a digital signal processor (DSP), a DSP device (DSPD), a programmable logic device (PLD), a field-programmable gate array (FPGA), general processors, controllers, microcontrollers, micro-processors, and other electronic units for implementing the functions of the present application, or their combinations.

For software implementation, the technology in the embodiments of the present disclosure may be implemented through modules (for example, procedures or functions) that perform the functions in the embodiments of the present disclosure. Software code may be stored in the memory and executed by the processor. The memory may be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A hybrid automatic repeat request-acknowledgement (HARQ-ACK) sending method, performed by a terminal, and comprising:
sending a joint HARQ-ACK codebook on a physical uplink control channel (PUCCH) resource;
wherein the joint HARQ-ACK codebook is composed of a plurality of HARQ-ACK codebooks, and the plurality of HARQ-ACK codebooks correspond to a plurality of downlink transmission resources from different transmission reception points (TRPs).

2. The method according to claim 1, the plurality of HARQ-ACK codebooks are semi-static or dynamic codebooks.

3. The method according to claim 2, wherein an order of the plurality of HARQ-ACK codebooks in the joint HARQ-ACK codebook is related to an order of a plurality of TRPs.

4. The method according to claim 3, wherein independent channel coding is performed on the plurality of HARQ-ACK codebooks; and code rates for channel coding of the plurality of HARQ-ACK codebooks are the same or different, and the plurality of HARQ-ACK codebooks are concatenated to obtain the joint HARQ-ACK codebook according to the order; or
the plurality of HARQ-ACK codebooks are concatenated to obtain the joint HARQ-ACK codebook according to the order, and channel coding is performed on the joint HARQ-ACK codebook.

5. The method according to claim 2, wherein if the plurality of HARQ-ACK codebooks are dynamic codebooks, a downlink assignment index (DAI) of the joint HARQ-ACK codebook is counted in an integral counting manner based on all TRPs corresponding to the plurality of HARQ-ACK codebooks.

6. The method according to claim 5, wherein the integral counting manner of the DAI is configured by a high layer.

7. The method according to claim 1, wherein the joint HARQ-ACK sent on the PUCCH resource has at least one of following characteristics:
in a same carrier, downlink transmission resources having a same HARQ process identifier correspond to one bit in the joint HARQ-ACK codebook; and
in a same carrier, downlink transmission resources having different HARQ process IDs correspond to different bits in the joint HARQ-ACK codebook, and an order of bits in the joint HARQ-ACK codebook is related to HARQ process IDs and an index of the carrier.

8. A terminal, comprising: a memory, a processor, and a program stored in the processor and executable on the processor, wherein the program, when executed by the processor, causes the terminal to perform:
sending a joint hybrid automatic repeat request-acknowledgement (HARQ-ACK) codebook on a physical uplink control channel (PUCCH) resource;
wherein the joint HARQ-ACK codebook is composed of a plurality of HARQ-ACK codebooks, and the plurality of HARQ-ACK codebooks correspond to a plurality of downlink transmission resources from different transmission reception points (TRPs).

9. The terminal according to claim 8, the plurality of HARQ-ACK codebooks are semi-static or dynamic codebooks.

10. The terminal according to claim 9, wherein an order of the plurality of HARQ-ACK codebooks in the joint HARQ-ACK codebook is related to an order of a plurality of TRPs.

11. The terminal according to claim 10, wherein independent channel coding is performed on the plurality of HARQ-ACK codebooks; and code rates for channel coding of the plurality of HARQ-ACK codebooks are the same or different, and the plurality of HARQ-ACK codebooks are concatenated to obtain the joint HARQ-ACK codebook according to the order; or
the plurality of HARQ-ACK codebooks are concatenated to obtain the joint HARQ-ACK codebook according to the order, and channel coding is performed on the joint HARQ-ACK codebook.

12. The terminal according to claim 9, wherein if the plurality of HARQ-ACK codebooks are dynamic codebooks, a downlink assignment index (DAI) of the joint HARQ-ACK codebook is counted in an integral counting manner based on all TRPs corresponding to the plurality of HARQ-ACK codebooks.

13. The terminal according to claim 12, wherein the integral counting manner of the DAI is configured by a high layer.

14. The terminal according to claim 8, wherein the joint HARQ-ACK sent on the PUCCH resource has at least one of following characteristics:
in a same carrier, downlink transmission resources having a same HARQ process identifier correspond to one bit in the joint HARQ-ACK codebook; and
in a same carrier, downlink transmission resources having different HARQ process IDs correspond to different bits in the joint HARQ-ACK codebook, and an order of the bits in the joint HARQ-ACK codebook is related to the HARQ process identifiers and an index of the carrier.

15. A non-transitory computer-readable storage medium, for storing a computer program which, when executed by a processor, causes the processor to perform:
sending a joint hybrid automatic repeat request-acknowledgements (HARQ-ACKs) codebook on a physical uplink control channel (PUCCH) resource; wherein
the joint HARQ-ACK codebook is composed of a plurality of HARQ-ACK codebooks, and the plurality of HARQ-ACK codebooks correspond to a plurality of downlink transmission resources from different transmission reception points (TRPs).

16. The non-transitory computer-readable storage medium according to claim 15, wherein the plurality of HARQ-ACK codebooks are semi-static or dynamic codebooks.

17. The non-transitory computer-readable storage medium according to claim 16, wherein an order of the plurality of HARQ-ACK codebooks in the joint HARQ-ACK codebook is related to an order of a plurality of TRPs.

18. The non-transitory computer-readable storage medium according to claim 17, wherein independent channel coding is performed on the plurality of HARQ-ACK codebooks; and code rates for channel coding of the plurality of HARQ-ACK codebooks are the same or different, and the plurality of HARQ-ACK codebooks are concatenated to obtain the joint HARQ-ACK codebook according to the order; or the plurality of HARQ-ACK codebooks are concatenated to obtain the joint HARQ-ACK codebook according to the order, and channel coding is performed on the joint HARQ-ACK codebook.

19. The non-transitory computer-readable storage medium according to claim 16, wherein if the plurality of HARQ-ACK codebooks are dynamic codebooks, a downlink assignment index (DAI) of the joint HARQ-ACK codebook is counted in an integral counting manner based on all TRPs corresponding to the plurality of HARQ-ACK codebooks.

20. The non-transitory computer-readable storage medium according to claim 15, wherein the joint HARQ-ACK sent on the PUCCH resource has at least one of following characteristics:
- in a same carrier, downlink transmission resources having a same HARQ process identifier correspond to one bit in the joint HARQ-ACK codebook; and
- in a same carrier, downlink transmission resources having different HARQ process IDs correspond to different bits in the joint HARQ-ACK codebook, and an order of bits in the joint HARQ-ACK codebook is related to the HARQ process IDs and an index of the carrier.

* * * * *